US006721752B1

(12) United States Patent
Kislanko

(10) Patent No.: US 6,721,752 B1
(45) Date of Patent: Apr. 13, 2004

(54) COMPUTER-BASED SYSTEM AND METHOD FOR INFERRING A FOUR-DIGIT CALENDAR YEAR FROM A DATE EXPRESSED IN A FORMAT HAVING A TWO-DIGIT CALENDAR YEAR

(75) Inventor: James P. Kislanko, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 639 days.

(21) Appl. No.: 08/962,428

(22) Filed: Oct. 31, 1997

(51) Int. Cl.[7] ............................................. G06F 17/30
(52) U.S. Cl. ..................... 707/101; 707/6; 707/102; 707/103; 717/143
(58) Field of Search ................. 707/1–10, 100–104, 707/200–206, 130, 143, 158; 395/684, 707, 704, 733, 739; 364/737, 770, 744; 717/130, 143, 158

(56) References Cited

U.S. PATENT DOCUMENTS

| | | | | | |
|---|---|---|---|---|---|
| 5,307,498 | A | * | 4/1994 | Eisen et al. ............... | 717/158 |
| 5,551,027 | A | * | 8/1996 | Choy et al. ............... | 707/201 |
| 5,596,554 | A | * | 1/1997 | Hagadorn ................. | 368/82 |
| 5,600,836 | A | * | 2/1997 | Alter ........................ | 707/101 |
| 5,630,118 | A | * | 5/1997 | Shaughnessy ............. | 707/1 |
| 5,644,762 | A | * | 7/1997 | Soeder ...................... | 707/6 |
| 5,668,989 | A | * | 9/1997 | Mao ......................... | 707/101 |
| 5,737,735 | A | * | 4/1998 | Soeder ...................... | 707/6 |
| 5,758,336 | A | * | 5/1998 | Brady ....................... | 707/6 |
| 5,758,346 | A | * | 5/1998 | Baird ........................ | 707/101 |
| 5,761,668 | A | * | 6/1998 | Adamchick ............... | 707/101 |
| 5,787,414 | A | * | 7/1998 | Miike et al. .............. | 707/2 |
| 5,806,063 | A | * | 9/1998 | Dickens .................... | 707/6 |
| 5,806,067 | A | * | 9/1998 | Connor ..................... | 707/100 |
| 5,809,500 | A | * | 9/1998 | Nolan ....................... | 707/6 |
| 5,812,841 | A | * | 9/1998 | Soeder ...................... | 707/6 |
| 5,835,909 | A | * | 11/1998 | Alter ........................ | 707/101 |
| 5,845,286 | A | * | 12/1998 | Colizza .................... | 707/101 |
| 5,852,824 | A | * | 12/1998 | Brown ...................... | 707/6 |
| 6,078,734 | A | * | 6/2000 | Carter et al. .............. | 707/101 |
| 6,092,067 | A | * | 7/2000 | Girling et al. ............. | 707/100 |
| 6,446,067 | B2 | * | 9/2002 | Togawa .................... | 707/6 |

OTHER PUBLICATIONS

The Year 2000 and 2–Digit Dates: A Guide for Planning and Implementation, Sixth Edition, Dec., 1996, published by IBM Chapter 4, 5, and 8, pp. 4–1 through 4–4, 5–1 through 5–13, and 8–1 through 8–25.*

COBOL Newsletter, Fall Issue 1997, Santa Teresa Lab, IBM, entitled "Tackling Your Year 2000 Challenge".

* cited by examiner

*Primary Examiner*—Shahid Alam
(74) *Attorney, Agent, or Firm*—Baker Botts LLP

(57) ABSTRACT

A computer-based system (10) for inferring an output date expressed in a format having a four-digit calendar year from a historical input date expressed in a format having a two-digit calendar year includes a converter (16) that receives from an application program (12) an input date parameter (52) corresponding to the input date and specifying a two-digit input year value. The converter (16) also receives from an operating system (18) a current system date recognizable to the converter (16) in a format having a four-digit calendar year, the first two digits of which have a current century value and the last two digits of which have a current two-digit value. If the input year value is less than or equal to the current two-digit value, the converter (16) infers the first two digits of the four-digit calendar year of the output date to be the current century value. The converter (16) may infer the first two digits of the four-digit calendar year of the output date to be "19" if the input year value is not less than or equal to the current two-digit value.

47 Claims, 4 Drawing Sheets

| | FUNCTION | FIRST FORMAT | FIRST DATE | SECOND FORMAT | SECOND DATE | NUMBER |
|---|---|---|---|---|---|---|
| 14→ | CONVERT | INPUT 44 | INPUT 44 | INPUT 44 | OUTPUT 46 | N/A |
| 14→ | ADJUST | INPUT 44 | INPUT 44 | INPUT 44 | OUTPUT 46 | INPUT 44 |
| 14→ | DELTA | INPUT 44 | INPUT 44 | INPUT 44 | INPUT 44 | OUTPUT 46 |
| 14→ | WEEKDAY | INPUT 44 | INPUT 44 | INPUT 44 | OUTPUT 46 | N/A |
| 14→ | CURRENT | N/A | N/A | INPUT 44 | OUTPUT 46 | N/A |
| 14→ | WINDOW | INPUT 44 | INPUT 44 | INPUT 44 | OUTPUT 46 | INPUT 44 |
| | ... | ... | ... | ... | ... | ... |

| | FUNCTION | FIRST FORMAT | FIRST DATE | SECOND FORMAT | SECOND DATE | NUMBER |
|---|---|---|---|---|---|---|
| 14→ | CONVERT | INPUT 44 | INPUT 44 | INPUT 44 | OUTPUT 46 | N/A |
| 14→ | ADJUST | INPUT 44 | INPUT 44 | INPUT 44 | OUTPUT 46 | INPUT 44 |
| 14→ | DELTA | INPUT 44 | INPUT 44 | INPUT 44 | INPUT 44 | OUTPUT 46 |
| 14→ | WEEKDAY | INPUT 44 | INPUT 44 | INPUT 44 | OUTPUT 46 | N/A |
| 14→ | CURRENT | N/A | N/A | INPUT 44 | OUTPUT 46 | N/A |
| 14→ | WINDOW | INPUT 44 | INPUT 44 | INPUT 44 | OUTPUT 46 | INPUT 44 |
| | ... | ... | ... | ... | ... | ... |

COMPUTER-BASED SYSTEM AND METHOD FOR INFERRING A FOUR-DIGIT CALENDAR YEAR FROM A DATE EXPRESSED IN A FORMAT HAVING A TWO-DIGIT CALENDAR YEAR

TECHNICAL FIELD OF THE INVENTION

This invention relates in general to the field of computer systems and software, and more particularly to a computer-based system and method for inferring a four-digit calendar year from a date expressed in a format having a two-digit calendar year.

BACKGROUND OF THE INVENTION

Many application programs manipulate dates, expressed in a wide variety of formats, according to their particular operation. For example, an inventory application program might recommend an action after determining the age of an inventoried item, a banking application program might calculate interest according to one or more dates, and a health care application program might determine the availability of coverage based on one or more dates. It is often desirable during operation of application programs to convert dates expressed in a format having a two-digit calendar year to dates expressed in a format having a four-digit calendar year. However, traditional techniques that infer the first two digits of a four-digit calendar year to be "19" in all cases are wholly inadequate on, and after Jan. 1, 2000, leading to what has been commonly referred to as the "year 2000 problem."

As the number and complexity of application programs continue to increase, and as Jan. 1, 2000 looms nearer, techniques for converting dates expressed in a format with a two-digit calendar year to dates expressed in a format having a four-digit calendar year have become increasingly important. A known technique for converting a date in a format having a two-digit calendar year receives input from the application program specifying a ninety-nine year window surrounding the date. Since the two-digit calendar year can occur only once during any ninety-nine year window, a four-digit calendar year can be unambiguously inferred whether the first two digits of the four-digit calendar should be "19" or "20". Although such techniques may be acceptable in some circumstances, they are often unable to correctly infer four-digit calendar years unless modifications are made to the application programs, for example, that allow the application programs to provide information specifying the ninety-nine year window. As a result, these techniques may involve increased costs and delays associated with additional programming and debugging requirements.

SUMMARY OF THE INVENTION

According to the present invention, disadvantages and problems associated with inferring a calendar year from a date expressed in a format having a two-digit year have been substantially reduced or eliminated.

According to one embodiment of the present invention, a computer-based system is provided for inferring an output date expressed in a format having a four-digit calendar year from a historical input date expressed in a format having a two-digit calendar year. The system includes a converter that receives from an application program an input date parameter corresponding to the input date and specifying a two-digit input year value. The converter also receives from an operating system a current system date recognizable to the converter in a format having a four-digit calendar year, the first two digits of which have a current century value and the last two digits of which have a current two-digit value. The converter compares the input year value with the current two-digit value and, if the input year value is less than or equal to the current two-digit value, infers the first two digits of the four-digit calendar year of the output date to be the current century value. The converter may infer the first two digits of the four-digit calendar year of the output date to be "19" if the input year value is not less than or equal to the current two-digit value.

The system and method of the present invention provide a number of important technical advantages. Unlike prior techniques for converting a date in a format having a two-digit calendar year, the system and method of the present invention are able to correctly infer a four-digit calendar year from a date expressed in a format having a two-digit year without requiring modifications to the application programs that need the inferred date. As a result, the present invention reduces costs and delays associated with additional programming and debugging activities that would otherwise be necessary. The present invention infers the correct four-digit calendar year regardless of whether the first two digits of the four-digit calendar year should be, for example, "19" or "20," providing an advantageous solution to the "year 2000 problem." Other important technical advantages are readily apparent to those skilled in the art from the following figures, description, and claims.

BRIEF DESCRIPTION OF THE DRAWINGS

For a complete understanding of the present invention and for further features and advantages thereof, reference is now made to the following description taken in conjunction with the accompanying drawings, in which.

DETAILED DESCRIPTION OF THE INVENTION

Figure 1:
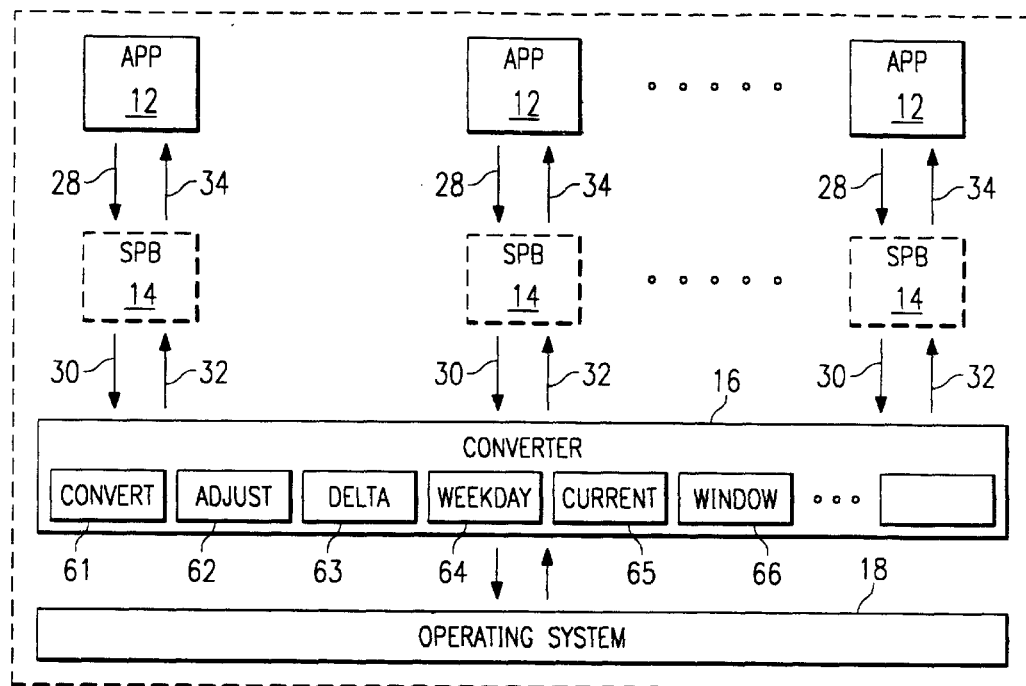
FIG. 1 illustrates an exemplary computer-based system for inferring a four-digit calendar year from a date expressed in a format having a two-digit calendar year according to the present invention.

FIG. 1 illustrates exemplary computer-based system 10 for inferring a four-digit calendar year from a date that is expressed in a format having a two-digit calendar year. System 10 includes one or more application programs (APP) 12 that communicate information with converter 16 using corresponding shared parameter blocks (SPB) 14. Application programs 12 and shared parameter blocks 14 are discussed herein in the singular, although references to a single application program 12 or shared parameter block 14 are meant to encompass the plural, where appropriate. Application program 12 may be any suitable computer program or portion thereof that acts upon or acts using one or more dates expressed in a format having a two-digit calendar year. Application program 12 may receive dates from operating system 18, dates from an autonomous device or program, dates entered manually using a graphical user interface, or any other appropriate dates in accordance with the programming of application program 12.

For example, application program 12 may include an inventory application program that recommends an action based on the age of an inventoried item, a banking application program that calculates interest according to one or more dates, a health care application program that determines the availability of coverage based on one or more dates, or any other suitable application program 12. In general, application program 12 provides dates expressed in a format having a two-digit calendar year to converter 16, along with other appropriate input parameters, and in return receives from converter 16 corresponding dates expressed in a format having a four-digit calendar year, along with other appropriate output parameters.

Converter 16 receives one or more input parameters from application program 12 and provides one or more output parameters to application program 12 using shared parameter block 14, as discussed more fully below with reference to FIG. 2. Converter 16 may receive input parameters from application program 12, from operating system 18, or from both application program 12 and operating system 18.

In one embodiment, converter 16 communicates with operating system 18 to determine the current system date, which operating system 18 may provide to converter 16 as an input parameter in any one of a number of formats, for example, a format having a two-digit calendar year, a format having a four-digit calendar year, a format that lacks an explicit calendar year, or any other appropriate format. Converter 16 is compatible with operating system 18, such that the current system date is recognizable to converter 16 in a format having a four-digit calendar year regardless of the actual format in which operating system 18 provides the current system date to converter 16. As discussed more fully below with reference to FIG. 2, converter 16 executes one or more of the following functions, without limitation, in accordance with the input parameters that are received from application program 12: (1) convert function 61, (2) adjust function 62, (3) delta function 63, (4) weekday function 64, (5) current function 65, (6) window function 66, and (7) any other suitable functions.

System 10 may operate on one or more computers 20 that are integral to or separate from the hardware and software that support application program 12, shared parameter block 14, converter 16, or operating system 18. Computer 20 may include an input device 22, such as a keypad, touch screen, microphone, or other device to accept information. An output device 24 may convey information associated with the operation of system 10, including digital or analog data, visual information, or audio information. Input device 22 and output device 24 may include fixed or removable storage media, such as magnetic computer disks, CD-ROM, or other suitable media to both receive output from and provide input to system 10. Computer 20 may have a processor 26 and associated volatile or non-volatile memory to execute instructions and manipulate information according to the operation of system 10. Converter 16 may be embodied as computer software, computer hardware, or a combination of computer hardware and software, and may be integral to or separate from application program 12, shared parameter block 14, and operating system 18.

In operation of system 10, at an appropriate point during the operation of application program 12, application program 12 calls converter 16 using a suitable application programming interface (API) and one or more suitable input parameters. Application program 12 and the API cooperate to place the input parameters into shared parameter block 14 corresponding to application program 12, as represented by arrow 28, and pass the input parameters to converter 16, as represented by arrow 30. Unless application program 12 requests the current system date from converter 16, as expressed in a specified format, input parameters passed to converter 16 include an input date parameter containing an input date or portion thereof expressed in a format having a two-digit calendar year. The input date may be either a historical input date originally received from operating system 18 or another suitable operating system, or derived from a date originally received from operating system 18 or another suitable operating system, or a future input date derived from a historical date originally received from operating system 18 or other operating system.

Converter 16 and its functions manipulate some or all of the input parameters, using the current system date from operating system 18, to infer a four-digit calendar year corresponding to the input date parameter and to generate appropriate output parameters using the inferred four-digit calendar year. Converter 16 then returns the output parameters, which may include the four-digit calendar year, to application program 12 using shared parameter block 14, as represented by arrows 32 and 34, and application program 12 continues operation. Application program 12 may call converter 16 once or multiple times during the operation of application program 12. As discussed below, converter 16 correctly infers the four-digit calendar year corresponding to the input date parameter received from application program 12 whether the first two digits of the four-digit calendar year should be "19" or "20." Although calendar years having first two digits "19" or "20" are discussed, the present invention contemplates operating with calendar years in any appropriate centuries.

Figure 2:
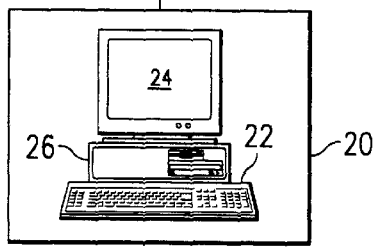
FIGS. 2 illustrates shared parameter blocks for a number of exemplary functions according to the present invention.

FIG. 2 illustrates shared parameter blocks 14 for convert function 61, adjust function 62, delta function 63, weekday function 64, current function 65, and window function 66 (shown in FIG. 1) that converter 16 may execute during operation of system 10. Shared parameter blocks contain input parameters 44 and output parameters 46. Particular input parameters 44 and output parameters 46 for each of these functions are indicated in FIG. 2. The symbol "N/A" is used to indicate parameters that are inapplicable for a particular function.

In one embodiment, shared parameters blocks 14 may contain, without limitation: (1) function parameters 48, which are input parameters 44 but are shown in FIG. 2 as already specifying the various functions discussed above; (2) first format parameters 50, which are input parameters 44 if applicable for a function; (3) first date parameters 52, which are input parameters 44 if applicable for a function; (4) second format parameters 54, which are input parameters 44 if applicable for a function; (5) second date parameters 56, which, if applicable for a function, may be input parameters 44 or output parameters 46 depending on the particular function; (6) number parameters 58, which, if applicable for a function, may be input parameters 44 or output parameters 46 depending on the particular function; and (7) any other suitable parameters not shown.

In one embodiment, in addition to function parameter 48, input parameters 44 include, without limitation: (1) for convert function 61, first format parameter 50, first date parameter 52, and second format parameter 54; (2) for adjust function 62, first format parameter 50, first date parameter 52, second format parameter 54, and number parameter 58; (3) for delta function 63, first format parameter 50, first date parameter 52, second format parameter 54, and second date parameter 56; (4) for weekday function 64, first format parameter 50, first date parameter 52, and second format parameter 54; (5) for current function 65, second format parameter 54; and (6) for window function 66, first format parameter 50, first date parameter 52, second format parameter 54, and number parameter 58. Although second format parameter 54 is shown as an input parameter 44 for current function 65, the present invention contemplates first format parameter 50 as an input parameter 44 for current function 65 instead of second format parameter 54.

Output parameters 46 may include, without limitation: (1) for convert function 61, second date parameter 56; (2) for adjust function 62, second date parameter 56; (3) for delta function 63, number parameter 58; (4) for weekday function 64, second date parameter 56; (5) for current function 65, second date parameter 56; and (6) for window function 66, second date parameter 56. Although second date parameter 56 is shown as an output parameter 46 for current function 65, the present invention contemplates first date parameter 52 as an output parameter 46 for current function 65 instead of second date parameter 56, for example, when first format parameter 50 is an input parameter 44 for current function 65.

Convert function 61 converts a historical input date that is expressed in an input date format having a two-digit calendar year to an output date expressed in an output date format having a four-digit calendar year, where the output date is the same date as the input date. A historical date is a date that application program 12 originally received from operating system 18, an autonomous device, a human being, or any other suitable source. An important technical advantage of the present invention is that convert function 61 infers the four-digit calendar year corresponding to the historical input date regardless of whether the first two digits of the input date, if expressed in a format having a four-digit calendar year, should be "19" or "20." As a result, even on and after Jan. 1, 2000, system 10 correctly infers four-digit calendar years for historical input dates without requiring modifications to application program 12 and the associated costs.

For example, if function parameter 48 specifies convert function 61, first format parameter 50 indicates an input date format having a two-digit calendar year, first date parameter 52 includes a historical input date or portion thereof having a two-digit calendar year, and second format parameter 54 indicates an output date format having a four-digit calendar year, converter 16 and convert function 61 use the current system date from operating system 18 to infer the four-digit calendar year that corresponds to first date parameter 52 and provides this four-digit calendar year to application program 12 as some or all of second date parameter 56. The operation of convert function 61 is further discussed below with a reference to FIGS. 3A through 3C.

Adjust function 62 adjusts a historical input date that is expressed in an input date format having a two-digit calendar year by a specified number of days, weeks, months, years, or other periods to determine an output date expressed in an output date format having a four-digit calendar year. Adjust function 62 determines the output date in a format with a four-digit calendar year regardless of whether the first two digits of the historical input date, if expressed in a format having a four-digit calendar year, should be "19" or "20." As a result, even on and after Jan. 1, 2000, system 10 correctly determines output dates that are adjusted from historical input dates without requiring modifications to application program 12 and associated costs. The present invention contemplates adjusting future input dates using adjust function 62 in addition to historical input dates.

For example, if function parameter 48 specifies adjust function 62, first format parameter 50 indicates an input date format having a two-digit year, first date parameter 52 includes a historical input date or portion thereof having a two-digit year, second format parameter 54 indicates an output date format having a four-digit calendar year, and number parameter 58 specifies a number of days, weeks, months, years, or other periods, then converter 16 uses the current system date from operating system 18 to infer a four-digit calendar year corresponding to first date parameter 52. Converter 16 may use convert function 61 to infer the four-digit calendar year. Converter 16 then adjusts the input date, now expressed in a format having a four-digit calendar year, according to number parameter 58 and provides the adjusted output date to application program 12 in a format having a four-digit calendar year as some or all of second date parameter 56. The operation of adjust function 62 is discussed further below with reference to FIGS. 3A through 3C.

Delta function 63 determines the number of days, weeks, months, years, or other specified periods between a historical first input date expressed in a first input date format having a two-digit calendar year and a historical second input date expressed in a second input date format having a two-digit calendar year. In the alternative, the first input date, the second input date, or both the first input date and the second input date may be a future date expressed in a format having either a two-digit calendar year or a four-digit calendar year. Delta function 63 determines the number of periods between the first and second input dates regardless of whether the first two digits of the first input date, the second input date, or both the first input date and the second input date, if expressed in a format having a four-digit calendar year, should be "19" or "20." As a result, even on and after Jan. 1, 2000, system 10 determines the number of specified periods between the first and second input dates without requiring modifications to application program 12 and the associated costs.

For example, if function parameter 48 specifies delta function 63, first format parameter 50 indicates a first input date format having a two-digit calendar year, first date parameter 52 includes a historical first input date or portion thereof having a two-digit calendar year, second format parameter 54 indicates a second input date format having a two-digit calendar year, and second date parameter 56 includes a historical first input date or portion thereof having a two-digit calendar year, converter 16 uses the current system date from operating system 18 to infer four-digit calendar years corresponding to first date parameter 52 and second date parameter 56. Converter 16 may use convert function 61 to infer the four-digit calendar years. If either first date parameter 52 or second date parameter 56 includes a four-digit calendar year, then converter 16 need not infer a four-digit calendar year for first date parameter 52 or second date parameter 56, as the case may be.

If first date parameter 52, second date parameter 56, or both first date parameter 52 and second date parameter 56 include a two-digit calendar year for a future input date, converter 16 uses a technique incorporating an appropriate year window to infer a corresponding four-digit calendar year for each such date parameter. In this case, converter 16 may use window function 66 discussed below to infer the four-digit calendar year. Converter 16 determines the number of specified periods between the input dates corresponding to first date parameter 52 and second date parameter 56 and provides the result to application program 12 as number parameter 58. The operation of delta function 63 is further discussed below with reference to FIGS. 3A through 3C.

Weekday function 64 determines the day of the week, in a specified format, that corresponds to a historical or future input date expressed in an input date format having a two-digit calendar year. Weekday function 64 determines the day of the week that corresponds to the input date regardless of whether the first two digits of the input date, if it were expressed in a format having a four-digit calendar year, should be "19" or "20." As a result, even on and after Jan. 1, 2000, system 10 determines the days of the week corresponding to historical or future input dates without requiring modifications to application program 12 and the associated costs.

For example, if function parameter 48 specifies weekday function 64, first format parameter 50 indicates an input date format having a two-digit calendar year, first date parameter 52 includes a historical or future input date or portion thereof having a two-digit calendar year, and second format parameter 54 specifies a suitable format for expressing a day of the week, converter 16 uses the current system date from operating system 18 to infer a four-digit calendar year corresponding to first date parameter 52. Converter may use convert function 61 to infer the four-digit calendar year for a historical input date and may use window function 66 discussed below to infer the four-digit calendar year for a future input date. Converter 16 then determines the day of the week that corresponds to first date parameter 52 and provides the result to application program 12 in the specified format as second date parameter 56. Operation of weekday function 64 is further discussed below with reference to FIGS. 3A through 3C.

Current function 65 returns the current system date from operating system 18 to application program 12 as an output date expressed in a specified output date format, for example, a format having a two-digit calendar year, a format having a four-digit calendar year, a format not explicitly including a calendar year, or any other format. For example, if function parameter 48 specifies current function 65 and second format parameter 54 indicates an output date format having a four-digit calendar year, converter 16 returns to application program 12, as some or all of second date parameter 56, the four-digit calendar year that corresponds to the current system date received from operating system 18. Similarly, if second format parameter 50 indicates an output date format that does not explicitly include a calendar year, converter 16 returns the current system date to application program 12 as second date parameter 56 without an explicit calendar year. Since converter 16 and operating system 18 are compatible, the current system date is recognizable to converter 16 in a format having a four-digit or two-digit calendar year regardless of the format in which the current system date is received. Converter 16 provides the current system date to application program 12 in the format application-program 12 specifies using second format parameter 50. Operation of current function 65 is further discussed below with reference to FIGS. 3A through 3C.

Window function 66 converts a future input date that is expressed in an input date format having a two-digit calendar year to an output date expressed in an output date format having a four-digit calendar year using a specified year window. In one embodiment, window function 66 is used for future input dates and convert function 61 is used for historical input dates. Window function 40 may be used in association with adjust function 62, delta function 63, and weekday function 64 if future input dates are involved. Window function 66 determines the four-digit calendar year that corresponds to the future input date regardless of whether the first two digits of the future input date, if expressed in a format having a four-digit calendar year, should be "19" or "20." As a result, even on and after Jan. 1, 2000, system 10 uses the specified year window and window function 66 to determine four-digit calendar years corresponding to future input dates without requiring modifications to application program 12 and the associated costs.

For example, if function parameter 48 specifies window function 66, first format parameter 50 indicates an input date format having a two-digit calendar year, first date parameter 52 includes a future input date or portion thereof having a two-digit calendar year, second format parameter 54 indicates an output date format having a four-digit calendar year, and number parameter 58 specifies the number of calendar years from the current system date calendar year until the end of the year window, converter 16 uses the current system date from operating system 18 and number parameter 58 to infer the four-digit calendar year corresponding to first date parameter 52. In one embodiment, application program 12 is able to provide number parameter 58 according to information specified during the programming of application program 12 concerning the maximum number of years in the future any future dates will or are likely to occur. Converter 16 provides the resulting future date, now expressed in a format having a four-digit calendar year, to application program 12 as some or all of second date parameter 56. The operation of window function 66 is further discussed below with reference to FIGS. 3A through 3C.

Figure 3A:
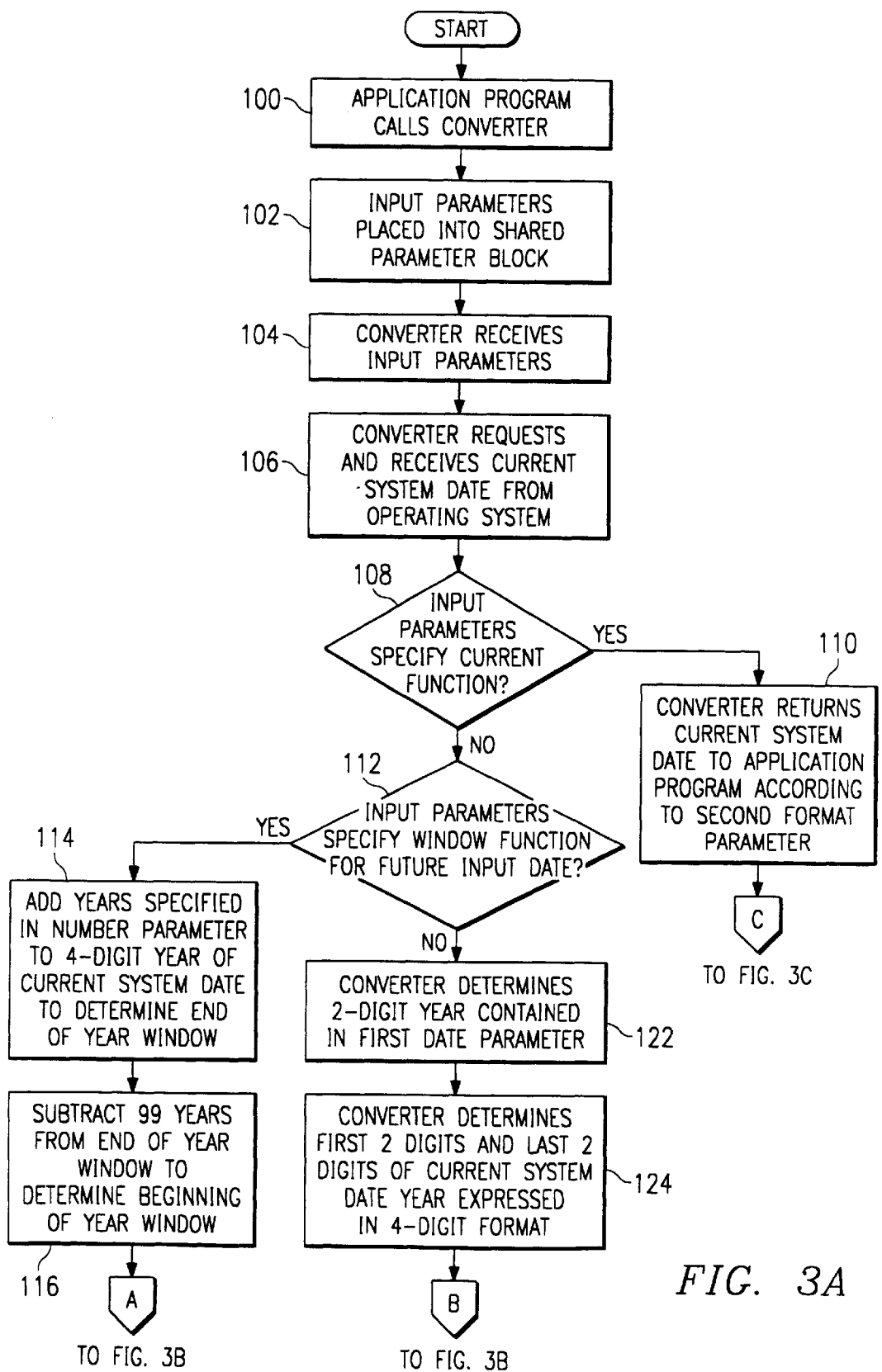
FIGS. 3A through 3C is a flowchart illustrating an exemplary computer-based method of inferring a four-digit calendar year from a date expressed in a format having a two-digit calendar year according to the present invention.
Figure 3B:
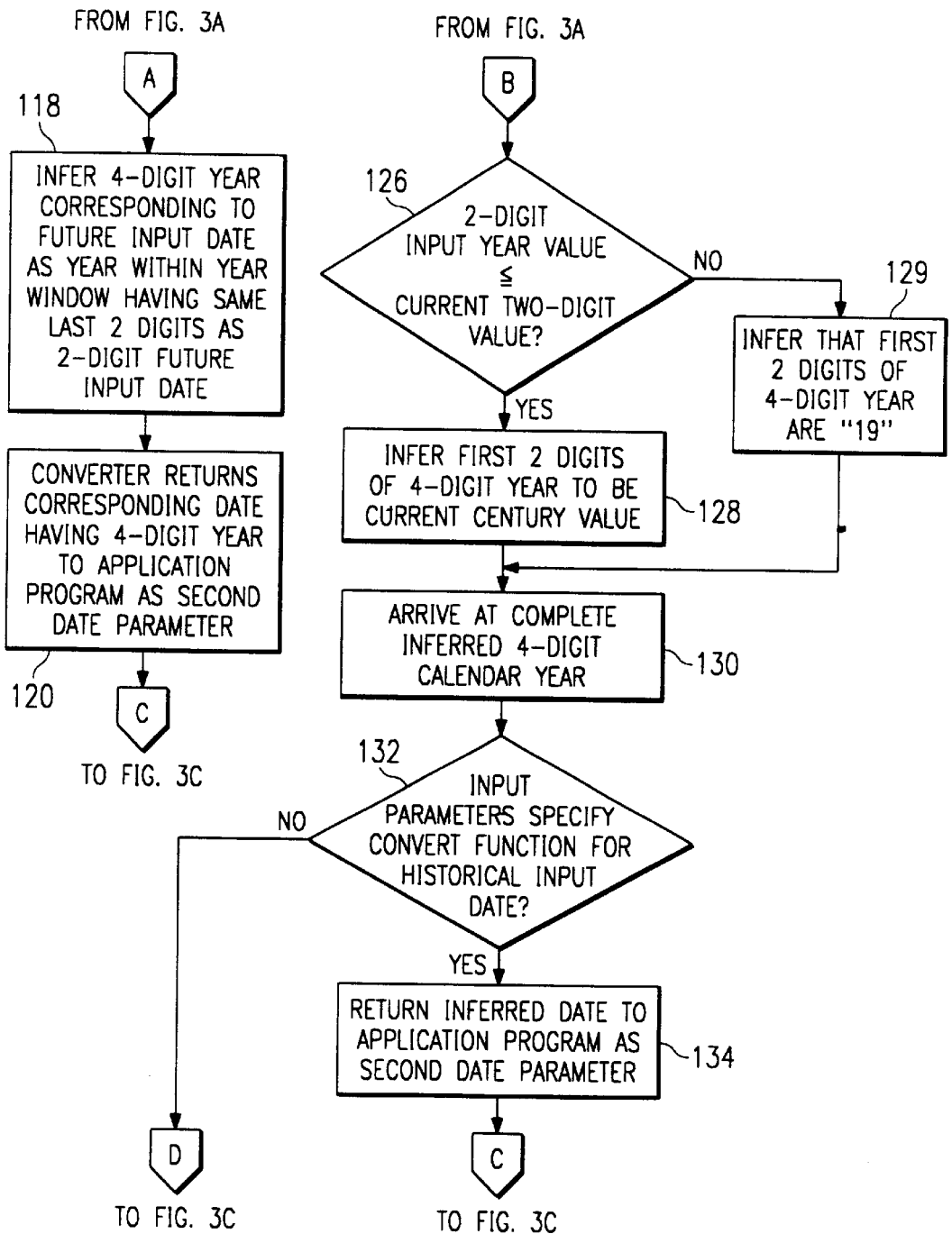
Figure 3C:
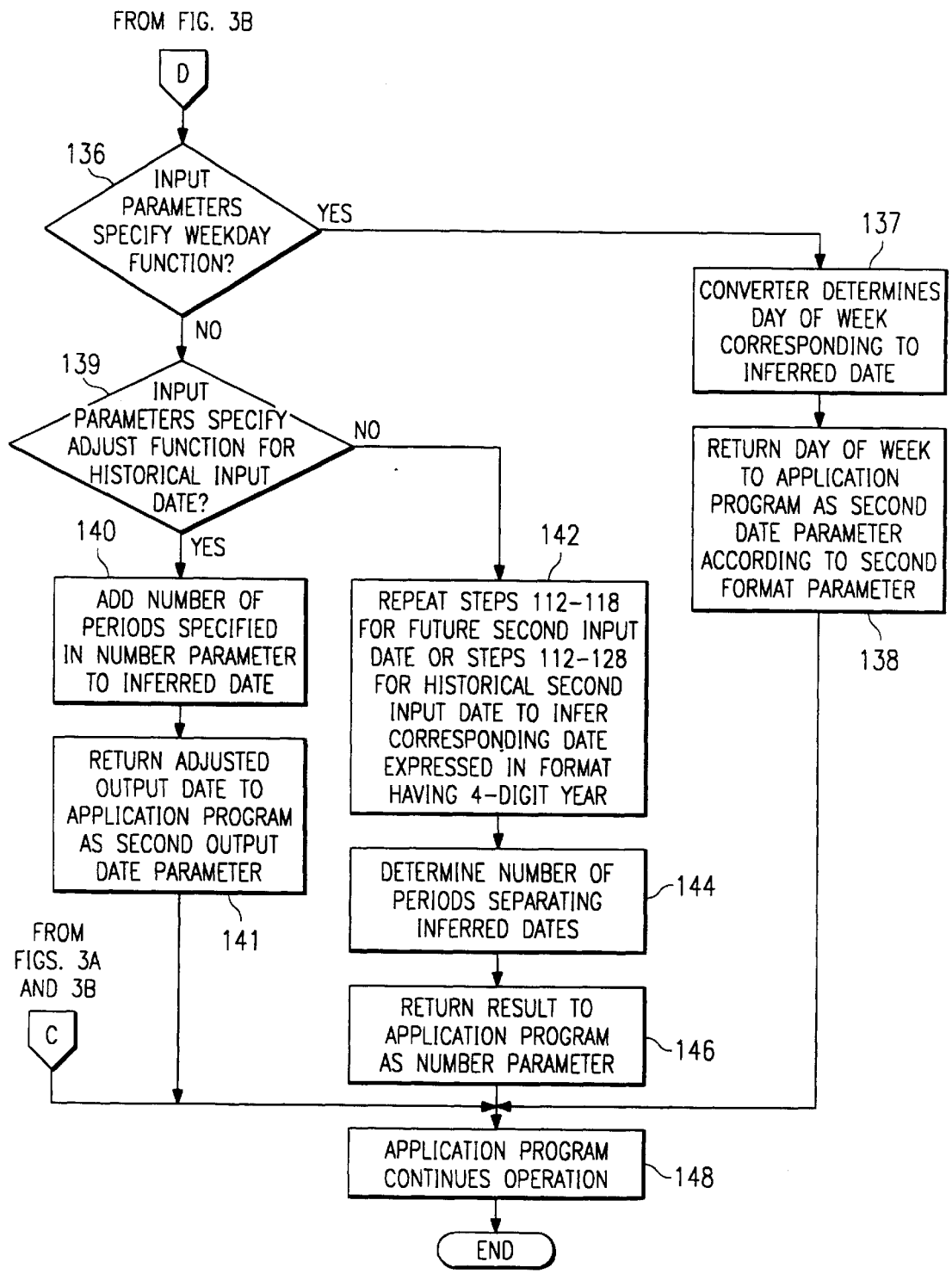

FIGS. 3A through 3C illustrates an exemplary method of inferring a four-digit calendar year from an input date expressed in an input date format having a two-digit calendar year. The method begins at step 100, where application program 12 calls converter 16. At step 102, application program 12 and the associated API cooperate to place appropriate input parameters 44 into corresponding shared parameter block 14. Input parameters 44 include function parameter 48, which instructs converter 16 to execute a particular function discussed above according to the needs of application program 12. As discussed above, a function associated with converter 16 may use one or more other functions as appropriate.

Converter 16 receives input parameters 44 in shared parameter block 14 at step 104 and, at step 106, requests and receives the current system date from operating system 18 recognizable in a format having a four-digit calendar year. If function parameter 48 has specified current function 65 at step 108, converter 16 returns the current system date to application program 12 at step 110 as second date parameter 56 in the format specified in second format parameter 54, for example, in a format having a two-digit calendar year, having a four-digit calendar year, without an explicit calendar year, or any other suitable format. After converter 16 returns the current system date to application program 12 at step 110, the method proceeds to step 148, where application program 12 continues its operation.

If current function 65 has not been specified at step 108, but function parameter 48 has specified window function 66 at step 112, for converter 16 to infer a four-digit calendar year corresponding to a future input date expressed in a format having a two-digit calendar year, converter 16 adds at step 114 the number of years specified in number parameter 58 to the current system date calendar year expressed in four-digit format to determine the end of the year window. At step 116, converter 16i subtracts ninety-nine years from the end of the year window to determine the beginning of the year window. At step 118, converter 16 infers the four-digit calendar year corresponding to the future input date, which is specified in first date parameter 52, as the single calendar year within the year window having last two digits that are the same as the two-digit calendar year of the future input date. At step 120, converter 16 returns the inferred four-digit calendar year of the output date to application program 12 as some or all of second date parameter 56, and the method proceeds to step 148.

If at step 112 function parameter 48 has not specified window function 66, in which case function parameter 48 has specified convert function 61, adjust function 62, delta function 63, or weekday function 64, converter 16 determines the two-digit calendar year contained in first date parameter 52 at step 122, referred to as the two-digit input year value. At step 124, converter 16 determines the first two digits and the last two digits of the current system date year expressed in four-digit format. The first two digits of the four-digit current system date year is referred to as the current century value and the last two digits of the four-digit current system date year is referred to as the current two-digit value. Since converter 16 and operating system 18 are compatible, converter 16 determines the current century value and the current two-digit value regardless of the format in which operating system 18 provides the current system date to converter 16 at step 106. For example, operating system 18 may provide the current system date to converter 16 in a format having a four-digit calendar year, a two-digit calendar year, without an explicit calendar year, or in any other recognizable format.

At step 126, if the two-digit input year value determined at step 122 is less than or equal to the current two-digit value determined at step 124, converter 16 infers the first two digits of the four-digit calendar year to be the current century value at step 128. At step 130, converter 16 determines the last two digits of the inferred four-digit calendar year to be the current two-digit value determined at step 122 to arrive at the complete inferred four-digit calendar year that corresponds to first date parameter 52.

For example, if first date parameter 52 is "Oct. 30, 1996," which is expressed in a format with the two-digit calendar year "96," and the current system date is "Oct. 30, 1999," which is expressed in a format with the four-digit calendar year "1999," converter 16 determines at step 126 that "96," the two-digit input year value determined at step 122, is less than or equal to "99," the current two-digit value determined at step 124. As a result, at step 128, converter 16 infers "19," the current century value determined at step 124, to be the first two digits of the inferred four-digit calendar year. At step 130, converter 16 arrives at the four-digit calendar year "1996" as the complete inferred four-digit calendar year corresponding to first date parameter 52.

As another example, if first date parameter 52 is "Oct. 30, 2000," which is expressed in a format having the two-digit calendar year "00," and the current system date is "Oct. 30, 2003," which is expressed in a format having the four-digit calendar year "2003," converter 16 determines at step 126 that "00," the two-digit input year value determined at step 122, is less than or equal to "03," the current two-digit value determined at step 124. As a result, at step 128, converter 16 infers "20", the current century value determined at step 124, to be the first two digits of the inferred four-digit calendar year. At step 130, converter 16 arrives at "2000" as the complete inferred four-digit calendar year corresponding to first date parameter 52.

If, at step 126, the two-digit input year value determined at step 122 is not less than or equal to the current two-digit value determined at step 124, converter 16 infers the first two digits of the inferred four-digit calendar year at step 129 to be "19." As above, the last two digits of the inferred four-digit calendar year are the two-digit input year value determined at step 122 and converter 16 arrives at the complete inferred four-digit calendar year at step 130.

For example, if first date parameter 52 is "Oct. 30, 1999," which is expressed in a format with the two-digit calendar year "99," and the current system date is "Oct. 30, 2000," which is expressed in a format with the four-digit calendar year "2000," converter 16 determines at step 126.that "99," the two-digit input year value determined at step 122, is not less than or equal to "00," the current two-digit value determined at step 124. As a result, at step 129, converter 16 infers "19" to be the first two digits of the inferred four-digit calendar year. At step 130, converter 16 arrives at "1999" as the complete inferred four-digit calendar year corresponding to first date parameter 52.

As another example, if first date parameter 52 is "Oct. 30, 1999," which is expressed in a format having the two-digit calendar year "99," and the current system date is "1997-10-30," which is expressed in a format having the four-digit calendar year "1997," converter 16 determines at step 126 that "99," the two-digit input year value determined at step 122, is not less than or equal to "97," the current two-digit value determined at step 124. As a result, at step 129, converter 16 infers "19" to be the first two digits of the inferred four-digit calendar year. At step 130, converter 16 arrives at "1999" as the complete inferred four-digit calendar year that corresponds to first date parameter 52.

At step 132, if function parameter 48 has specified convert function 61 to convert a historical input date expressed in a format having a two-digit calendar year to an output date expressed in a format having a four-digit calendar year, converter 16 returns the complete inferred date determined at step 130, or a suitable portion thereof, to application program 12 at step 134 as second date parameter 56. The method then proceeds to step 148. If, at step 132, function parameter 48 has not specified convert function 61, but function parameter 48 has specified weekday function 64 at step 136, converter 16 determines the day of the week at step 137 that,corresponds to the date inferred at step 130. Converter 16 returns the determined day of the week to application program 12 at step 138 as second date parameter 56 in the format specified in second format parameter 54, and the method proceeds to step 148.

If function parameter 48 has specified neither convert function 61 at step 132 nor weekday function 64 at step 136, but function parameter 48 has specified adjust function 62 for a historical input date at step 139, converter 16 adds at step 140 the number of days, weeks, months, years, or other periods specified in number parameter 58 to the date inferred at step 130. The method is discussed for first date parameter 52 specifying a historical input date, although as discussed above the present invention contemplates first date parameter 52 specifying a future input date. Converter 16 returns the adjusted output date or a suitable portion thereof to application program 12 at step 141 as second date parameter 56, and the method proceeds to step 148.

If function parameter 48 has specified neither convert function 61 at step 132, weekday function 64 at step 136, nor adjust function 62 at step 139, function parameter 48 will have specified delta function 63 for converter 16 to determine the number of days, weeks, months, years, or other periods between first and second input dates specified in first and second date parameters 52 and 56, respectively. The method is discussed for first date parameter 52 specifying a historical first input date, although as discussed above the present invention contemplates first date parameter 52 specifying a future first input date. At step 142, if second date parameter 56 specifies a future second input date, such that converter 16 uses window function 66 to infer a corresponding four-digit calendar year, converter repeats steps 112–118. In the alternative, if second date parameter 56 specifies a historical second input date, such that converter 16 uses convert function 61 to infer a corresponding four-digit calendar year, converter 16 repeats steps 112–128.

Converter 16 uses conventional techniques to determine the number of periods separating the complete inferred dates at step 144 and returns the result to application program 12 at step 146 as number parameter 58. Application program 12 continues operation at step 148, and the method ends.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A computer-based system for inferring an output date expressed in a format having a four-digit calendar year from a historical input date expressed in a format having a two-digit calendar year, comprising:

an application program operable to determine conversion needs and to communicate an input date parameter corresponding to the input date and at least one function parameter of a plurality of function parameters, the input date parameter specifying a two-digit input year value;

an operating system operable to communicate a current system date recognizable in a format having a four-digit calendar year, the first two digits of the four-digit calendar year for the current system date having a current century value and the last two digits of the four-digit calendar year for the current system date having a current two-digit value;

a shared parameter block coupled to the application program and operable to receive from the application program the at least one function parameter of the plurality of function parameters; and a converter coupled to the application program and to the operating system, the converter operable to:

receive the input date parameter and the at least one function parameter from the shared parameter block and the current system date from the operating system, the at least one function parameter operable to instruct the converter to execute a particular function according to conversion needs of the application program;

recognize the four-digit calendar year for the current system date, compare the input year value with the current two-digit value and, if the input year value is less than or equal to the current two-digit value, to infer the first two digits of the four-digit calendar year of the output date to be the current century value; and communicate the output date to the application using the shared parameter block.

2. The system of claim 1, wherein the converter is further operable to determine the second two digits of the four-digit calendar year of the output date to be the input year value and to communicate the four-digit calendar year of the output date to the application program.

3. The system of claim 1, wherein the converter is operable to infer the first two digits of the four-digit calendar year of the output date to be "19" if the input year value is not less than or equal to the current two-digit value.

4. The system of claim 1, wherein the application program is operable to communicate a second input date parameter to the converter corresponding to a second input date, the second input date parameter specifying a second two-digit input year value, the converter operable to infer a four-digit calendar year corresponding to the second input date parameter and to determine the number of periods between the input date and the second input date.

5. The system of claim 1, wherein the application program is operable to communicate a number parameter to the converter, the converter operable to adjust the output date in accordance with the number parameter to determine an adjusted output date.

6. The system of claim 1, wherein the converter is further operable to receive a future input date from the application program and to execute a window function to infer a four-digit calendar year of an output date corresponding to the future input date.

7. A computer-based system for inferring an output date expressed in a format having a four-digit calendar year from a historical input date expressed in a format having a two-digit calendar year, comprising:

a converter;

the converter operable to receive an input date parameter from an application program and to receive at least one function parameter of a plurality of function parameters from a shared parameter block, the input date parameter corresponding to the input date and specifying a two-digit input year value, the application program operable to determine conversion needs, the at least one function parameter operable to instruct the converter to execute a particular function according to conversion needs of the application program;

the converter operable to receive a current system date from an operating system and to recognize a four-digit calendar year associated with the current system date, the first two digits of the four-digit calendar year having a current century value and the last two digits of the four-digit calendar year having a current two-digit value;

the converter further operable to compare the input year value with the current two-digit value and, if the input year value is less than or equal to the current two-digit value, to infer the fist two digits of the four-digit calendar year of the output date to be the current century value; and the converter further operable to communicate the output date to the application program using the shared parameter block.

8. The converter of claim 7, wherein the converter is further operable to determine the second two digits of the four-digit calendar year of the output date to be the input year value and to communicate the four-digit calendar year of the output date to the application program.

9. The converter of claim 7, wherein the converter is operable to communicate at least the four-digit calendar year of the output date to the application program using the shared parameter block.

10. The converter of claim 7, wherein the converter is operable to infer the first two digits of the four-digit calendar year of the output date to be "19" if the input year value is not less than or equal to the current two-digit value.

11. The converter of claim 7, wherein the converter is operable to receive a second input date parameter from the application program corresponding to a second input date, the second input date parameter specifying a second two-digit input year value, the converter operable to infer a four digit calendar year corresponding to the second input date parameter and to determine the number of periods between the input date and the second input date.

12. The system of claim 7, wherein the converter is further operable to receive a number parameter from the application program and to adjust the output date according to the number parameter to determine an adjusted output date.

13. A computer-based method for inferring an output date expressed in a format having a four-digit calendar year from a historical input date expressed in a format having a two-digit calendar year, comprising:

determining conversion needs at an application program;
   receiving an input date parameter from the application program and at least one function parameter of a plurality of function parameters from a shared parameter block, the input date parameter corresponding to the input date and specifying a two-digit input year value;
   receiving a current system date from an operating system;
   executing a particular function according to the at least one function parameter and according to the conversion needs of the application program;
   recognizing a four-digit calendar year associated with the current system date, the first two digits of the four-digit calendar year for the current system date having a current century value and the last two digits of the four-digit calendar year for the current system date having a current two-digit value;
   comparing the input year value with the current two-digit value;
   if the input year value is less than or equal to the current two-digit value, inferring the first two digits of the four-digit calendar year of the output date to be the current century value; and
   communicating the output date to an application program using the shared parameter block.

14. The method of claim 13, further comprising the steps of:
   determining the second two digits of the four-digit year of the output date to be the input year value; and
   communicating at least the four-digit calendar year of the output date to the application program.

15. The method of claim 13, further comprising the step of inferring the first two digits of the four-digit calendar year of the output date to be "19" if the input year value is not less than or equal to the current two-digit value.

16. The method of claim 13, further comprising the steps of:
   receiving a second input date parameter from the application program corresponding to a second input date, the second input date parameter specifying a second two-digit input year value;
   inferring a four-digit calendar year corresponding to the second input date parameter; and
   determining the number of periods between the input date and the second input date.

17. The method of claim 13, fisher comprising the steps of:
   receiving a number parameter from the application program; and
   adjusting the output date according to the number parameter to determine an adjusted output date.

18. The method of claim 13, further comprising the steps of:
   receiving a future input date from the application program; and
   executing a window function to infer a four-digit calendar year of an output date corresponding to the future input date.

19. A computer-based system for inferring an output parameter from an input date parameter, comprising:
   an application program operable to:
      receive one or more function parameters and one or more input date parameters, each function parameter specifying a corresponding function; and
      store the one or more function parameters and the one or more input date parameters in one or more shared parameter blocks, each shared parameter block comprising a function parameter and at least one input date parameter; and
   a converter associated with the application program, the converter operable to:
      receive an input date parameter and a function parameter from a selected shared parameter block, the received function parameter operable to instruct the converter to apply the corresponding function to the received input date parameter;
      calculate an output parameter according to the received function parameter and the received input date parameter; and
      store the output parameter in the selected shared parameter block.

20. The system of claim 19, wherein:
   the selected shared block comprises an input form parameter; and
   the application program is further operable to format the input date parameter in accordance with the input form parameter.

21. The system of claim 19, wherein:
   the selected shared block comprises an output form parameter; and
   the converter is further operable to format the output parameter in accordance with the output form parameter.

22. The system of claim 19, the converter further operable to calculate the output parameter according to the received function parameter and the received input date parameter by:
   determining that the received function parameter specifies a convert function;
   receiving a current year comprising a current century and a current two-digit year;
   comparing the input date parameter comprising a two-digit input year with the current two-digit year; and
   inferring an output century of the output parameter to be the current century if the two-digit input year is less than or equal to the current two-digit year.

23. The system of claim 19, the converter further operable to calculate the output parameter according to the received function parameter and the received input date parameter by:
   determining that the received function parameter specifies an adjust function;
   receiving a input number parameter from the shared parameter block, the input number parameter specifying a number of periods;
   converting the input date parameter comprising a two-digit input year to a four-digit input year; and adjusting the four-digit input year according to the number parameter to yield the output parameter.

24. The system of claim 19, the converter further operable to calculate the output parameter according to the received function parameter and the received input date parameter by:
- determining that the received function parameter specifies a delta function;
- receiving a next input date parameter from the shared parameter block;
- converting the input date parameter comprising a two-digit input year to a four-digit input year; and
- calculating a difference between the input date parameter and the next input date parameter to yield the output parameter.

25. The system of claim 19, the converter further operable to calculate the output parameter according to the received function parameter and the received input date parameter by:
- determining that the received function parameter specifies a weekday function; and
- calculating a day of the week corresponding to the input date parameter to yield the output parameter.

26. The system of claim 19, the converter further operable to calculate the output parameter according to the received function parameter and the received input date parameter by:
- determining that the received function parameter specifies a current function; and
- determining a current year to yield the output parameter.

27. The system of claim 19, the converter further operable to calculate the output parameter according to the received function parameter and the received input date parameter by:
- determining that the received function parameter specifies a window function; and
- converting the input date parameter comprising a two-digit input year to a four-digit input year according to the window function.

28. A method for inferring an output parameter from an input date parameter, comprising:
- receiving one or more function parameters and one or more input date parameters, each function parameter specifying a corresponding function;
- storing the one or more function parameters and the one or more input date parameters in one or more shared parameter blocks, each shared parameter block comprising a function parameter and at least one input date parameter;
- receiving an input date parameter and a function parameter from a selected shared parameter block, the received function parameter comprising an instruction for applying the corresponding function to the received input date parameter;
- calculating an output parameter according to the received function parameter and the received input date parameter; and
- storing the output parameter in the selected shared parameter block.

29. The method of claim 28, further comprising formatting the input date parameter in accordance with an input form parameter, the selected shared block comprising the input form parameter.

30. The method of claim 28, further comprising formatting the output parameter in accordance with an output form parameter, the selected shared block comprising the output form parameter.

31. The method of claim 28, further comprising calculating the output parameter according to the received function parameter and the received input date parameter by:
- determining that the received function parameter specifies a convert function;
- receiving a current year comprising a current century and a current two-digit year;
- comparing the input date parameter comprising a two-digit input year with the current, two-digit year; and
- inferring an output century of the output parameter to be the current century if the two-digit input year is less than or equal to the current two-digit year.

32. The method of claim 28, further comprising calculating the output parameter according to the received function parameter and the received input date parameter by:
- determining that the received function parameter specifies an adjust function;
- receiving a input number parameter from the shared parameter block, the input number parameter specifying a number of periods;
- converting the input date parameter comprising a two-digit input year to a four-digit input year; and
- adjusting the four-digit input year according to the number parameter to yield the output parameter.

33. The method of claim 28, further comprising calculating the output parameter according to the received function parameter and the received input date parameter by:
- determining that the received function parameter specifies a delta function;
- receiving a next input date parameter flour the shared parameter block;
- converting the input date parameter comprising a two-digit input year to a four-digit input year; and
- calculating a difference between the input date parameter and the next input date parameter to yield the output parameter.

34. The method of claim 28, further comprising calculating the output parameter according to the received function parameter and the received input date parameter by:
- determining that the received function parameter specifies a weekday function; and
- calculating a day of the week corresponding to the input date parameter to yield the output parameter.

35. The method of claim 28, further comprising calculating the output parameter according to the received function parameter and the received input date parameter by:
- determining that the received function parameter specifies a current function; and
- determining a current year to yield the output parameter.

36. The method of claim 28, further comprising calculating the output parameter according to the received function parameter and the received input date parameter by:
- determining that the received function parameter specifies a window function; and
- converting the input date parameter comprising a two-digit input year to a four-digit input year according to the window function.

37. Software for inferring an output parameter from an input date parameter, the software embodied in a medium and operable to:
- receive one or more function parameters and one or more input date parameters, each function parameter specifying a corresponding function;
- store the one or more function parameters and the one or more input date parameters in one or more shared parameter blocks, each shared parameter block comprising a function parameter and at least one input date parameter;

receive an input date parameter and a function parameter from a selected shared parameter block, the received function parameter comprising an instruction for applying the corresponding function to the received input date parameter;

calculate an output parameter according to the received function parameter and the received input date parameter; and store the output parameter in the selected shared parameter block.

38. The software of claim 37, further operable to format the input date parameter in accordance with an input form parameter, the selected shared block comprising the input form parameter.

39. The software of claim 37, further operable to format the output parameter in accordance with an output form parameter, the selected shared block comprising the output form parameter.

40. The software of claim 37, further operable to calculate the output parameter according to the received function parameter and the received input date parameter by:

determining that the received function parameter specifies a convert function;

receiving a current year comprising a current century and a current two-digit year;

comparing the input date parameter comprising a two-digit input year with the current two-digit year; and inferring an output century of the output parameter to be the current century if the two-digit input year is less than or equal to the current two-digit year.

41. The software of claim 37, further operable to calculate the output parameter according to the received function parameter and the received input date parameter by:

determining that the received function parameter specifies an adjust function;

receiving a input number parameter from the shared parameter block, the input number parameter specifying a number of periods;

converting the input date parameter comprising a two-digit input year to a four-digit input year; and adjusting the four-digit input year according to the number parameter to yield the output parameter.

42. The software of claim 37, further operable to calculate the output parameter according to the received function parameter and the received input date parameter by:

determining that the received function parameter specifies a delta function;

receiving a next input date parameter from the shared parameter block;

converting the input date parameter comprising a two-digit input year to a four-digit input year; and calculating a difference between the input date parameter and the next input date parameter to yield the output parameter.

43. The software of claim 37, further operable to calculate the output parameter according to the received function parameter and the received input date parameter by:

determining that the received function parameter specifies a weekday function; and calculating a day of the week corresponding to the input date parameter to yield the output parameter.

44. The software of claim 37, further operable to calculate the output parameter according to the received function parameter and the received input date parameter by:

determining that the received function parameter specifies a current function; and determining a current year to yield the output parameter.

45. The software of claim 37, further operable to calculate the output parameter according to the received function parameter and the received input date parameter by:

determining that the received function parameter specifies a window function; and converting the input date parameter comprising a two-digit input year to a four-digit input year according to the window function.

46. A system for inferring an output parameter from an input date parameter, comprising:

means for receiving one or more function parameters and one or more input date parameters, each function parameter specifying a corresponding function;

means for storing the one or more function parameters and the one or more input date parameters in one or more shared parameter blocks, each shared parameter block comprising a function parameter and at least one input date parameter;

means for receiving an input date parameter and a function parameter from a selected shared parameter block, the received function parameter comprising an instruction for applying the corresponding function to the received input date parameter;

means for calculating an output parameter according to the received function parameter and the received input date parameter; and means for storing the output parameter in the selected shared parameter block.

47. A computer-based system for inferring an output parameter from an input date parameter, comprising:

an application program operable to:

receive one or more function parameters and one or more input date parameters, each function parameter specifying a corresponding function; and store the one or more function parameters and the one or more input date parameters in one or more shared parameter blocks, each shared parameter block comprising a function parameter and at least one input date parameter; and a converter associated with the application program, the converter operable to:

receive an input date parameter and a function parameter from a selected shared parameter block, the received function parameter operable to instruct the converter to apply the corresponding function to the received input date parameter, the selected shared block comprising an output form parameter;

calculate an output parameter according to the received function parameter and the received input date parameter, the converter further operable to calculate the output parameter comprising a first output parameter according to the received function parameter comprising a first function parameter and the received input date parameter by:

determining that the first function parameter specifies a convert function;

receiving a current year comprising a current century and a current two-digit year;

comparing the input date parameter comprising a two-digit input year with the current two-digit year; and inferring an output century of the first output parameter to be the current century if the two-digit input year is less than or equal to the current two-digit year, the converter further operable to calculate the output parameter comprising a second output parameter according to the received function parameter comprising a second function parameter and the received input date parameter by:

determining that the second function parameter specifies an adjust function;

receiving a input number parameter from the shared parameter block, the input number parameter specifying a number of periods;

converting the input date parameter comprising a two-digit input year to a four-digit input year; and adjusting the four-digit input year according to the number parameter to yield the second output parameter, the converter further operable to calculate the output parameter comprising a third output parameter according to the received function parameter comprising a third function parameter and the received input date parameter by:

determining that the third function parameter specifies a delta function;

receiving a next input date parameter from the oared parameter block;

converting the input date parameter comprising a two-digit input year to a four-digit input year; and calculating a difference between the input date parameter and the next input date parameter to yield the third output parameter, the converter further operable to calculate the output parameter comprising a fourth output parameter according to the received function parameter comprising a fourth function parameter and the received input date parameter by:

determining that the fourth function parameter specifies a weekday function; and calculating a day of the week corresponding to the input date parameter to yield the fourth output parameter, the converter further operable to calculate the output parameter comprising a fifth output parameter according to the received function parameter comprising a fifth function parameter and the received input date parameter by:

determining that the fifth function parameter specifies a current function; and determining a current year to yield the fifth output parameter, the converter further operable to calculate the output parameter comprising a sixth output parameter according to the received function parameter comprising a sixth function parameter and the received input date parameter by:

determining that the sixth function parameter specifies a window function; and converting the input date parameter comprising a two-digit input year to a four-digit input year according to the window function to yield the sixth output parameter;

format the output parameter in accordance with the output form parameter; and store the output parameter in the selected shared parameter block, wherein the selected shared block comprises an input form parameter, the application program being further operable to format the input date parameter in accordance with the input form parameter.

\* \* \* \* \*